Figure 2:
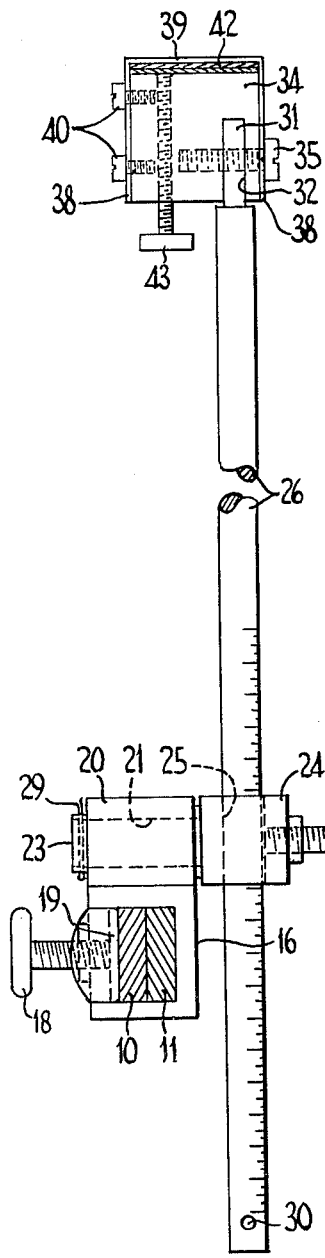

Aug. 22, 1950      H. J. SCHNORBUS      2,519,508
MEASURING INSTRUMENT
Filed Sept. 10, 1946      2 Sheets-Sheet 1
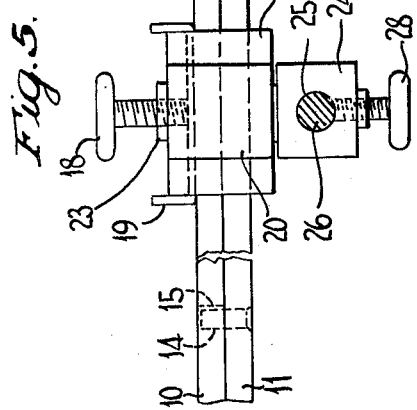
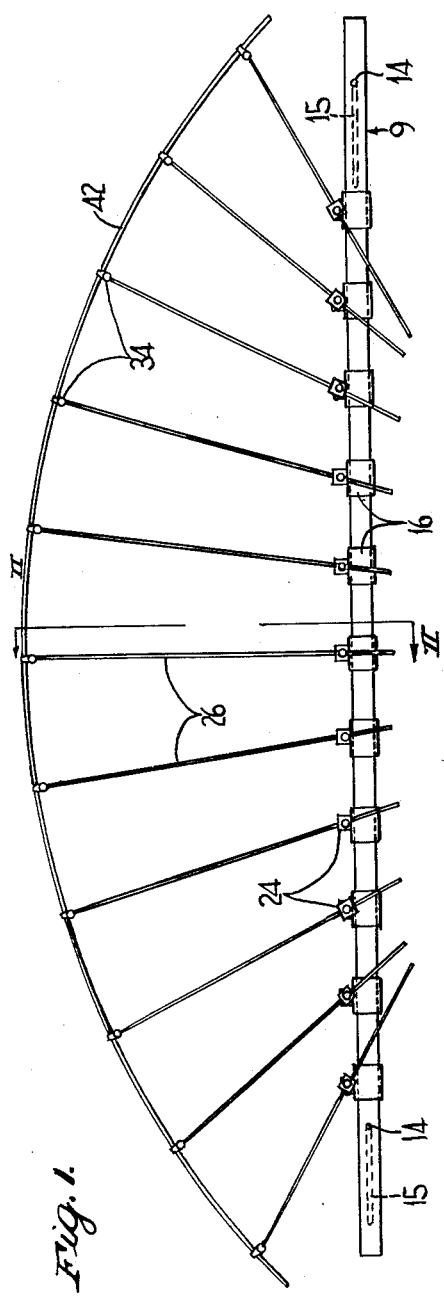
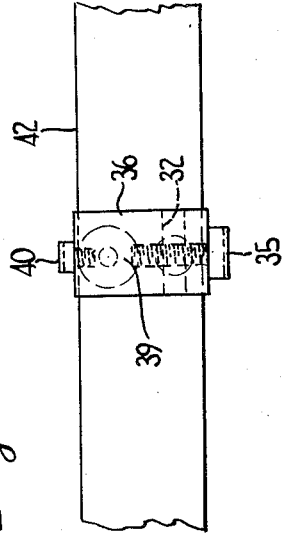
INVENTOR.
HENRY J. SCHNORBUS
BY
Olen E. Bee
ATTORNEY.

Aug. 22, 1950  H. J. SCHNORBUS  2,519,508
MEASURING INSTRUMENT
Filed Sept. 10, 1946  2 Sheets-Sheet 2

INVENTOR.
HENRY J. SCHNORBUS
BY
Olen E Bee
ATTORNEY.

Patented Aug. 22, 1950

2,519,508

UNITED STATES PATENT OFFICE 2,519,508

MEASURING INSTRUMENT

Henry J. Schnorbus, Baltimore, Md., assignor to Pittsburgh Plate Glass Company, Allegheny County, Pa., a corporation of Pennsylvania Application September 10, 1946, Serial No. 695,905

1 Claim. (Cl. 33—176)

This invention relates to measuring instruments and it has particular relation to a curve gauging instrument adapted to fit against curved structures to determine the size and curvature of members to be fitted to such curved structures.

One object of the invention is to provide an improved gauging instrument adapted to determine dimensions of curved closures to be fitted into framework or openings in window, or other structures.

Another object of the invention is to provide an improved universally flexible curve-measuring instrument adapted to be set to indicate curvatures of various forms.

In one form of instrument embodying the invention a framework adjustable both longitudinally and laterally is composed of a pair of bars arranged in sliding contact through collars which keep them assembled against each other and which permit them to be extended to vary the overall length of the instrument. Pivotal arms extend from the collars at intervals along the length of the pair of bars and at their outer ends they support a flexible member which can be in the form of a strip of spring metal so mounted that it can be pressed against a curved surface and the arms will adjust themselves slidably in the collars. Readings can be taken to indicate the curvature thus determined and fittings for the curved structure can be formed from such readings. By using an instrument of this kind the use of patterns which usually require considerable structure and labor to build are obviated.

Figure 3:
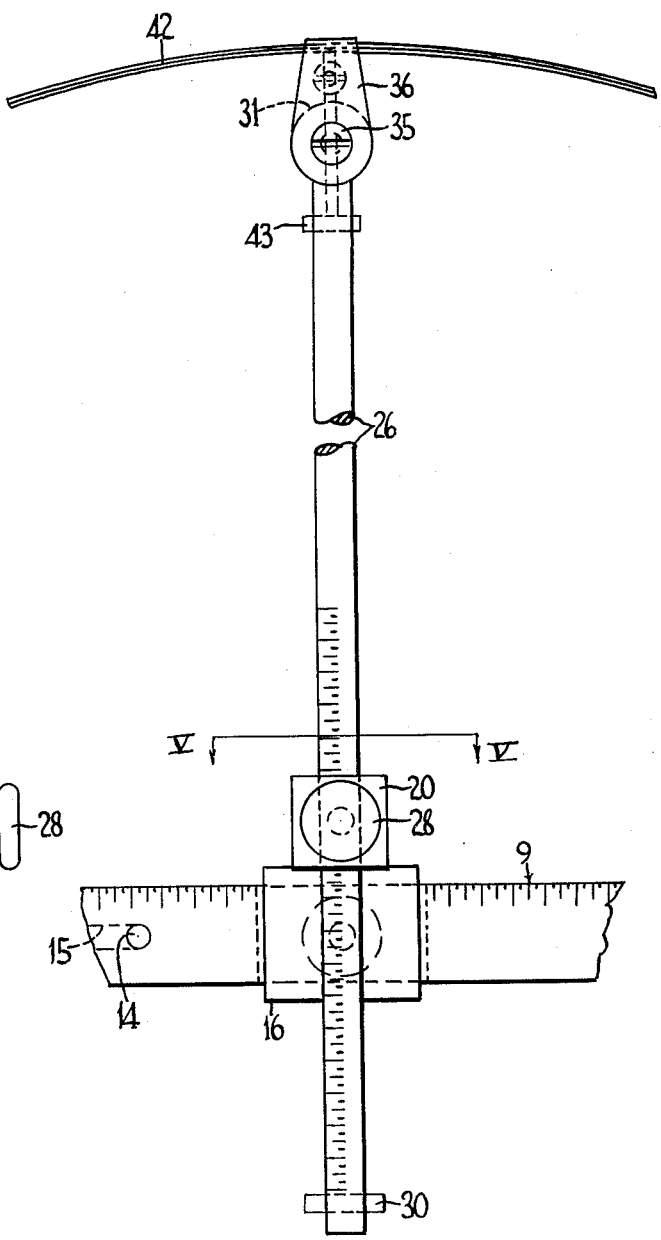

In the drawing:

Figure 1 is a side elevation of an instrument designed according to the invention; Figure 2 is a fragmentary vertical section, on a larger scale, taken substantially along the line II—II of Fig. 1 and with portions shown in elevation; Figure 3 is a fragmentary side elevation on a larger scale showing in detail adjustable elements of the structure; Figure 4 is a fragmentary plan of the structure shown in Figure 3; and Figure 5 is a horizontal section taken substantially along the line V—V of Fig. 3.

In practicing the invention, I have designed a two-ply or sectional beam 9 comprising a pair of bars 10 and 11 placed flat against each other and held in parallel aligned relation by means of screw pins 14 threaded through the bar 11 and extending slidably into slots 15 formed in the other bar 10. Adjusting collars 16 disposed at conveniently spaced intervals surround the pair of bars. Each collar 16 has a set screw 18 threaded through one of its walls so as to press against a brass plate 19 which fits between the wall and the side of the adjacent bar 10. After manipulating the set screws 18 the collars can be loosened and slid along the pair of bars to any position desired, and in addition the bars themselves can be adjusted relative to each other as the pin 14 slides in the slot 15.

The upper portion of each collar 16 is formed with an integral bearing block 20 having a horizontal opening 21 therein to receive a bearing pin 23 which has at one end an integral head 24. Each head has a guide opening 25 extending transversely therethrough to receive an arm 26 which is disposed at right angles to the axis of the bearing pin 23. A set screw 28 threaded through the wall of the head 24 bears at its end against the arm 26 to lock it at any desired position in the head. The pin 23 is held against accidental displacement from its position in the bearing opening 21 by means of a cotter pin 29 secured in the end portion of the pin. Likewise, the arm 26 is limited in its adjustability in the head 24 by means of a similar cotter pin 30 secured adjacent the arm end.

The upper end of each arm 26 has a flattened head 31 disposed in a notch 32 that is formed in the lower portion of a block 34. A bolt 35 is a screw threaded into the block 34 and through the flattened head of the arm so that the block and head can be locked rigidly together, or by loosening the bolt 35, the block can be pivoted upon the end of the arm. It is to be noted that the axis of the bearing pin 23 and the axis of the bolt 35 are parallel.

A metal clip 36 having parallel flanges 38 disposed along opposite sides of the block 34 also has an upper integral web 39 which is spaced slightly from the upper surface of the block 34. Each of the arms 26 is provided with one of these blocks 34. The bolt 35 passes through one of the flanges 38 of each clip 36 and suitable fastening elements, such as screws 40, secure the other flange to the block to form a rigid assembly of block and clip.

Two very thin strips or leaves 42 of tempered spring steel are disposed between the block 34 and web 39 of each clip so that the double leaf spring is held at several locations along its length. The mounting of the spring leaves is such that they can be slid relative to the blocks 34 and clips 36. This adjustment is facilitated by a set screw 43 threaded through the block 34 and having its end engageable with the surface of the inner leaf 42.

By setting the collars 16 and blocks 34 at desired positions the size of the measuring instrument as a whole can be varied to accommodate relatively large or small measurements. After the size of the instrument has been determined generally, the set screws 18 and 43 are tightened. In order to measure specifically the curvature of an opening, for example, the curvature of a framework into which a curved section of sheet glass is to be fitted, the pair of spring leaves is pressed against the surfaces of the curved structure while the arms 26 are slidable in the heads 24. The curvature of the rim of the instrument defined by the pair of spring leaves 42 will then adjust itself to the shape of the opening to be measured, while the blocks 34 can pivot on the bolts 35 to permit free bending of the leaves 42. The arms 26 can be calibrated and graduated so that the measurements are easily readable upon the instrument. Graduations likewise can be applied to the bars 10 and 11, reading of which can be coordinated with the readings on the arms 19, to indicate measurements of any curve. It is to be understood that the instrument is adapted to measure both convex and concave frames or bodies, as all of the arms can be moved inwardly or outwardly approximately at the extent of their length.

Although only one form of the invention has been shown and described in detail it will be apparent to those skilled in the art that the invention is not so limited but that various changes can be made therein without departing from the spirit of the invention or the scope thereof as exemplified in the appended claim.

I claim:

In a curve measuring instrument, a sectional beam including two relatively extensible sections lying in coextensive relation, holders at least partially surrounding and spaced adjustably along the length of the beam to guide the sections in longitudinally slidable relation along each other, means for selectively locking the holders upon the sections in a rigid assembly, arms having swivel supports on said holders and said arms being adjustably slidable in said swivel supports, a block having a pivotal connection upon the outer end of each arm, a resilient two-ply strip of metal passing along the outer surfaces of the blocks and including two relatively slidable strip sections, and clips partially embracing the respective blocks and releasably securing the strip to said blocks to permit selective extension of the two-ply strip in accordance with the extension of the sectional beam.

HENRY J. SCHNORBUS.

REFERENCES CITED

The following references are of record in the file of this patent:

UNITED STATES PATENTS

| Number | Name | Date |
| --- | --- | --- |
| 413,930 | Driscoll | Oct. 29, 1889 |
| 1,272,976 | McLucas | July 16, 1918 |
| 1,325,851 | Kern | Dec. 23, 1919 |
| 1,579,702 | Gottschalk | Apr. 6, 1926 |
| 2,220,422 | Nelson | Mar. 5, 1940 |
| 2,222,407 | Gobel | Nov. 19, 1940 |
| 2,285,582 | Human | June 9, 1942 |
| 2,404,880 | Lateur | July 30, 1946 |
| 2,424,042 | Lundberg | July 15, 1947 |